Feb. 10, 1970     M. R. REPPERT     3,494,669

VEHICLE WHEEL ATTACHMENT ADAPTER

Filed Dec. 18, 1968

INVENTOR.
MERLYN R. REPPERT
BY
SOKOLSKI & WOHLGEMUTH
ATTORNEYS

# United States Patent Office 3,494,669
Patented Feb. 10, 1970

3,494,669
VEHICLE WHEEL ATTACHMENT ADAPTER
Merlyn R. Reppert, Torrance, Calif., assignor to Appliance Plating Co., Inc., Harbor City, Calif., a corporation of California
Filed Dec. 18, 1968, Ser. No. 784,785
Int. Cl. B60b 27/00
U.S. Cl. 301—9                                    5 Claims

ABSTRACT OF THE DISCLOSURE

An adapter plate has four studs fixedly attached thereto arranged along the circumference of a circle. Three holes are provided in the plate for receiving bolts for attaching the plate to the hub of a vehicle, such hub having four threaded attachment receptacles. A fourth attachment bolt and a fifth stud are provided for by an insert member which fits into a mating hole formed in the adapter plate, one end of such insert comprising a stud which lies along the circumference of the circle on which the other studs lie, the other end of the insert comprising a bolt which fits into the fourth receptacle of the wheel hub.

---

This invention relates to vehicle wheel attachment adapters, and more particularly to such an adapter suitable for enabling the attachment of a wheel having five attachment holes to a wheel hub having four attachment receptacles.

In making custom wheel installations and in emergency situations it is sometimes necessary to adapt a wheel having five holes for receiving wheel hub studs (as in most American cars) so that it can be attached to a wheel hub having four threaded attachment receptacles, such as, for example, in a Volkswagen. What would appear to be the obvious solution to this problem, i.e., merely providing an adapter plate having five studs protruding therefrom to receive the wheel and four holes therein for receiving the attachment bolts for attaching the plate to the wheel hub, is inadequate in view of the fact that the four equally spaced holes and the five equally spaced studs necessary to accomplish this end result lie along circles of approximately the same diameter and one of the studs will necessarily overlap one of the holes. It is thus difficult or impossible to accommodate both the bolt holes and the studs on a single plate without sacrificing the structural integrity of the unit.

To eliminate either one of the studs or one of the bolts would also compromise the strength of the wheel attachment which is also highly undesirable.

Prior art devices for solving this problem are somewhat cumbersome and expensive in their construction, requiring either a plurality of adapter units or somewhat involved construction.

The device of this invention provides a simple and economical devices for effecting the desired end results. This is achieved without any sacrifice of the structural integrity of the wheel attachment and by means of a single adapter plate which operates in conjunction with an insert member.

It is therefore the principal object of this invention to provide a simple and economical device for enabling the attachment of a wheel having five attachment holes to a wheel hub having four attachment receptacles.

The device of the invention will now be described in connection with the accompanying drawings of which:

FIG. 5 is a partially cutaway cross sectional view illustrating a wheel attached to a wheel hub by means of the device of the invention.

Figure 1:
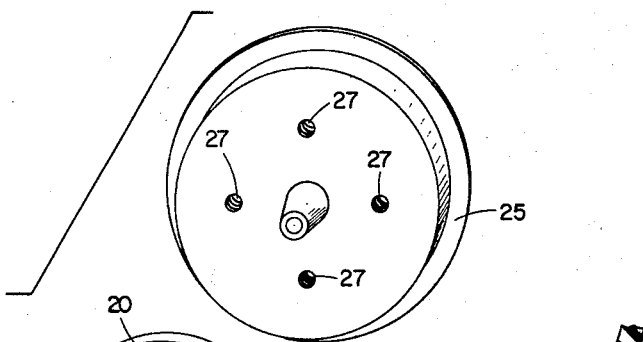
FIG. 1 is a perspective exploded view illustrating an embodiment of the invention.
Figure 3:
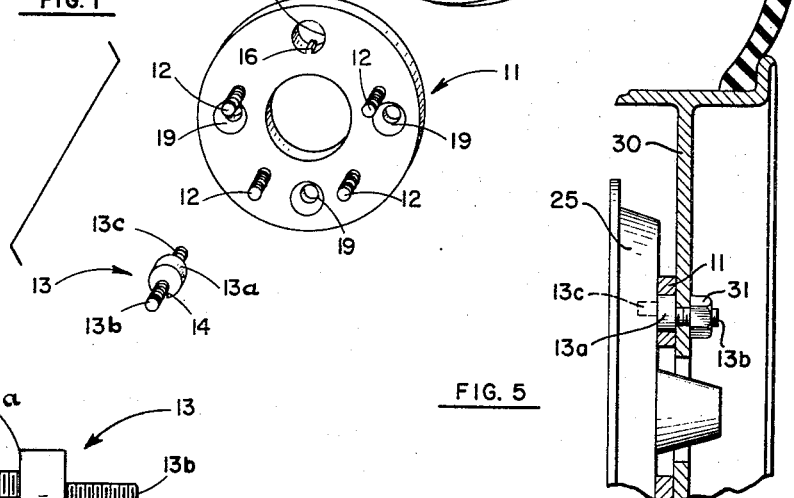
FIG. 3 is a side elevation view of the insert member utilized in the embodiment of FIG. 2.
Figure 3:
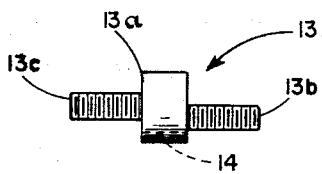
Figure 2:
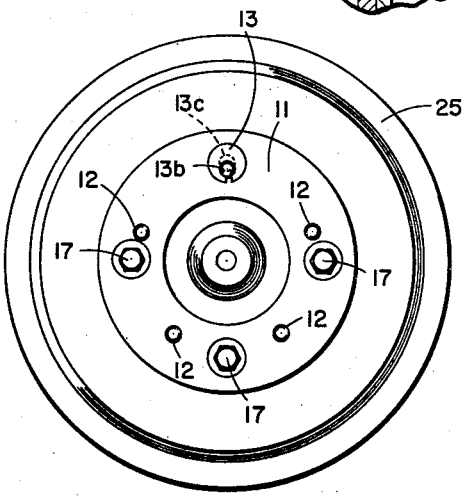
FIG. 2 is a plan view illustrating an embodiment of the invention as attached to a wheel hub.
Figure 4:
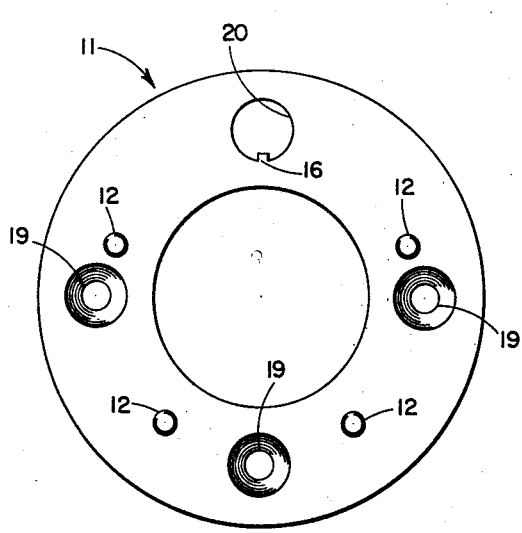
FIG. 4 is a plan view illustrating the adapter plate of the embodiment of FIG. 2.

Briefly described, the device of the invention comprises an adapter plate having three holes therein for receiving bolts for attaching the plate to a wheel hub having four attachment receptacles arranged in a circle. The plate further has four studs protruding therefrom for receiving the attachment holes of a wheel having five such holes arranged in a circle. The fourth attachment bolt for attaching the plate to the wheel hub and the fifth stud for receiving the wheel are provided for by means of an insert member which fits in an aligned position into a hole formed in the adapter plate. The insert member has a bolt portion extending from one side thereof which is positioned so that it mates with an associated one of the hub receptacles and a stud portion at the opposite end thereof which is positioned to properly mate with an associated attachment hole in the wheel. The stud and bolt portions of the insert may be offset from each other so that these two portions are in proper alignment for attachment, such alignment being assured by means of a key formed in the plate which mates with a groove formed in the insert member.

Referring now to the drawings, adapter plate 11 has four threaded studs 12 which are fixedly attached thereto and which extend therefrom. Plate 11 further has four holes 19 formed therein which may be beveled, and which receive bolts 17 which are utilized to attach the plate to wheel hub 25, the bolts engaging threaded receptacles 27 formed in the wheel hub. Adapter plate 11 further has a hole 20 formed therein for receiving insert member 13. The insert member has a central portion 13a which has a grove 14 formed therein, groove 14 mating with key 16 which projects into hole 20 for the adapter plate. Extending from one side of central portion 13a is a threaded cylindrical portion 13c which has the same diameter as the threaded portions of bolts 17 and acts as the fourth bolt for attachment to the wheel hub 25. Extending from the other side of central portion 13a is a cylindrical threaded portion 13b which has the same diameter as studs 12 and which acts as the fifth stud for receiving the wheel. Threaded portions 13c and 13b are offset from each other to accommodate for the difference in the diameters of the circles along which the hole 19 and the studs 12 lie.

With the central portion 13a of the insert inserted in hole 20, alignment of portions 13c and 13b in their respective circles is readily achieved by means of key 16, the threaded attachment of portion 13c to its mating receptacle 27 being loosened slightly as necessary to achieve the alignment of bolts 17 with their associated receptacles. This end result can most easily be achieved by first threading portion 13c into its associated hole so that it is almost but not fully tightened. The plate 11 is then placed in approximate position with central portion 13a inserted in hole 20. The adapter plate 11 can then be rotated as necessary to achieve the desired alignment. The wheel 30 is fastened to studs 12 and threaded portion 13b by means of nuts 31.

The device of this invention thus provides simple yet highly effective means for enabling the attachment of a wheel having five attachment holes to a wheel hub having four attachment receptacles. It can readily be appreciated that the same principles can be utilized to adapt the attachment of wheels having a different number of attachment holes than five to a dissimilar hub member in the same manner as described herein.

I claim:
1. An adapter device for attaching a wheel having a first number of circularly arranged attachment holes to a hub member having a different number of circularly arranged threaded attachment receptacles, comprising:
   an adapter plate having a group of holes formed therein, said holes being circularly arranged to mate with the receptacles of said wheel hub and being one less in number than said wheel hub receptacles, said adapter plate further having a plurality of circularly arranged studs protruding therefrom, said studs mating with the holes in said wheel, there being one less number of studs than said number of wheel attachment holes, and
   an insert member having a central portion, a first threaded portion extending from one side of said central portion, said first threaded portion being similar in size and diameter to said studs, and a second threaded portion extending from the other side central portion, said second threaded portion mating with at least one of the receptacles in said hub member,
   said adapter plate further having a hole formed therein for receiving the central portion of said insert member, said central portion of said insert member fitting into said last mentioned hole with said first threaded portion extending from the side of said plate from which said studs protrude, parallel to said studs and positioned along the circumference of the circle formed by said studs, and said second threaded portion extending from the side of said plate opposite to that from which the studs protrude and positioned along the circumference of the circle formed by said group of holes.

2. The device of claim 1 and further including means for aligning said insert in said plate comprising a groove formed in the central portion of said insert member and a key extending from the wall of the hole in which the central portion of said insert member is inserted, said key fitting in said groove to maintain said threaded portions along their respective associated circle circumferences.

3. The device of claim 2 wherein the number of holes in said group of holes in said plate comprises 3, and the number of stubs extending from said plate comprises 4.

4. The device as recited in claim 1 and further including bolts for fitting through each of said group of holes, said bolts matingly engaging said receptacles to attach said plate to said hub with said second threaded portion of said insert member threadably engaging one of said sub receptacles.

5. The device as recited in claim 1 wherein the first and second threaded portions of said insert member lie along parallel axis which are offset from each other.

References Cited

UNITED STATES PATENTS

| | | | |
|---|---|---|---|
| 2,570,559 | 10/1951 | Juergenson | 301—9 |
| 2,779,630 | 1/1957 | Klinker | 301—9 |
| 2,970,008 | 1/1961 | Leach | 301—1 |
| 3,025,109 | 3/1962 | Martin | 301—9 |
| 3,361,482 | 1/1968 | Stevens | 301—9 |

FOREIGN PATENTS 561,428   8/1923   France.

RICHARD J. JOHNSON, Primary Examiner

PO-1050
(5/69)

UNITED STATES PATENT OFFICE
CERTIFICATE OF CORRECTION

Patent No. 3,494,669      Dated February 10 1970

Inventor(s) Merlyn R. Reppert

It is certified that error appears in the above-identified patent and that said Letters Patent are hereby corrected as shown below:

Column 1, line 57, "devices" should read ---device---.

Column 3, line 19, after "side" insert ---of said---.

SIGNED AND
SEALED
JUN 23 1970

(SEAL)
Attest:

Edward M. Fletcher, Jr.
Attesting Officer

WILLIAM E. SCHUYLER, JR.
Commissioner of Patents